(12) United States Patent
Coffy et al.

(10) Patent No.: US 8,859,703 B2
(45) Date of Patent: Oct. 14, 2014

(54) BIMODAL PIPE RESIN AND PRODUCTS MADE THEREFROM

(75) Inventors: Tim Coffy, Houston, TX (US); Steven Gray, Florence, KY (US); David Knoeppel, League City, TX (US); Cyril Chevillard, Dickinson, TX (US); David Rauscher, Angleton, TX (US); Carlos Corleto, Seabrook, TX (US); Gerhard Guenther, Houston, TX (US); Brian B. Cole, Kingwood, TX (US); Stan Biesert, Friendswood, TX (US); Vincent Barre, Jacksonville, FL (US); Ruby L. Curtis, League City, TX (US); Son Nguyen, Friendswood, TX (US); Danielle Childress, Webster, TX (US)

(73) Assignee: Fina Technology, Inc., Houston, TX (US)

( * ) Notice: Subject to any disclaimer, the term of this patent is extended or adjusted under 35 U.S.C. 154(b) by 231 days.

(21) Appl. No.: 13/338,304

(22) Filed: Dec. 28, 2011

(65) Prior Publication Data

US 2012/0091621 A1    Apr. 19, 2012

Related U.S. Application Data

(62) Division of application No. 12/777,553, filed on May 11, 2010, now Pat. No. 8,110,644, which is a division of application No. 11/774,255, filed on Jul. 6, 2007, now abandoned.

(60) Provisional application No. 60/830,173, filed on Jul. 11, 2006.

(51) Int. Cl.

| | | |
|---|---|---|
| *C08F 10/02* | (2006.01) | |
| *B29C 47/00* | (2006.01) | |
| *C08F 10/00* | (2006.01) | |
| *C08F 210/16* | (2006.01) | |
| *C08F 110/02* | (2006.01) | |

(52) U.S. Cl.
CPC ............. *C08F 10/00* (2013.01); *C08F 210/16* (2013.01); *C08F 2400/02* (2013.01); *C08F 10/02* (2013.01); *C08F 110/02* (2013.01)
USPC ...................... 526/352; 264/209.1; 264/210.1

(58) Field of Classification Search
CPC ...... C08F 10/00; C08F 10/02; C08F 2500/05; C08L 23/06; C08L 666/06
USPC .............................. 526/352; 264/209.1, 210.1
See application file for complete search history.

(56) References Cited

U.S. PATENT DOCUMENTS

| | | | |
|---|---|---|---|
| 7,037,977 B2 | 5/2006 | Miserque et al. | |
| 2004/0058803 A1* | 3/2004 | Knoeppel et al. | ............. 502/103 |
| 2004/0198911 A1 | 10/2004 | Van Dun et al. | |
| 2007/0007680 A1* | 1/2007 | Henri Barre et al. | ......... 264/40.1 |
| 2008/0287608 A1* | 11/2008 | Nord-Varhaug et al. | ..... 525/240 |

FOREIGN PATENT DOCUMENTS

| | | | |
|---|---|---|---|
| CA | 2459552 A1 | 2/2003 | |
| WO | WO 2005002744 A1 * | 1/2005 | ............... B05D 1/26 |

OTHER PUBLICATIONS

Canadian Office Action issued in Canadian Application No. 2,657,139 issued on May 30, 2013 (3 pages).

\* cited by examiner

*Primary Examiner* — Ling Choi
*Assistant Examiner* — Chun-Cheng Wang

(57) ABSTRACT

Disclosed is a bimodal Ziegler-Natta catalyzed polyethylene, having a density of from 0.930 g/cc to 0.960 g/cc, and a molecular weight distribution of from 10 to 25, wherein an article formed therefrom has a PENT of at least 1500. Also disclosed is a method of preparing a tubular article including obtaining a bimodal polyethylene having a density of from 0.930 g/cc to 0.960 g/cc and a molecular weight distribution of from 10 to 25, and processing the polyethylene under conditions where a specific energy input (SEI) is less than 300 kW·h/ton, and wherein the article has a PENT of at least 1500. Further disclosed is a method for controlling the degradation of polyethylene including polymerizing ethylene monomer, recovering polyethylene, extruding the polyethylene, and controlling the degradation of polyethylene by measuring the SEI to the extruder and adjusting throughput and/or gear suction pressure keep SEI less than 300 kW·h/ton, and forming an article.

20 Claims, 9 Drawing Sheets

Specific Energy Input Versus Suction Pressure, ANOVA

Pellet Weight Cumulative Distribution

Pellet Weight Skewness and Kurtosis

GPC Trace of Big and Small Pellets

PENT of Big and Small Pellets

Pellet Size Recommended for Optimal Single Screw Extruder Feeding

Pellet Size Distribution

- ○ 30 psi, 378 F, XT10N-F
- △ 25 psi, 386 F, XT10N-F
- ◇ 22 psi, 386 F, XT10N-F
- ■ 22 psi, 410 F, XT10N-F
- □ 28 psi, XT10N-C
- × Pipe, XT10N-C

FIG. 9
Carreau-Yasuda Results (Rate & Suction Pressure Changes)
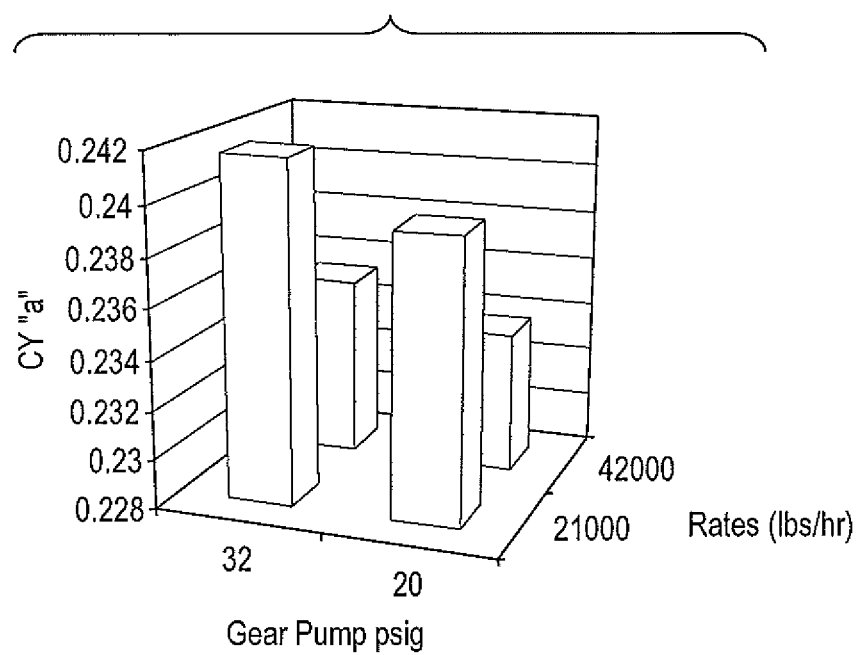
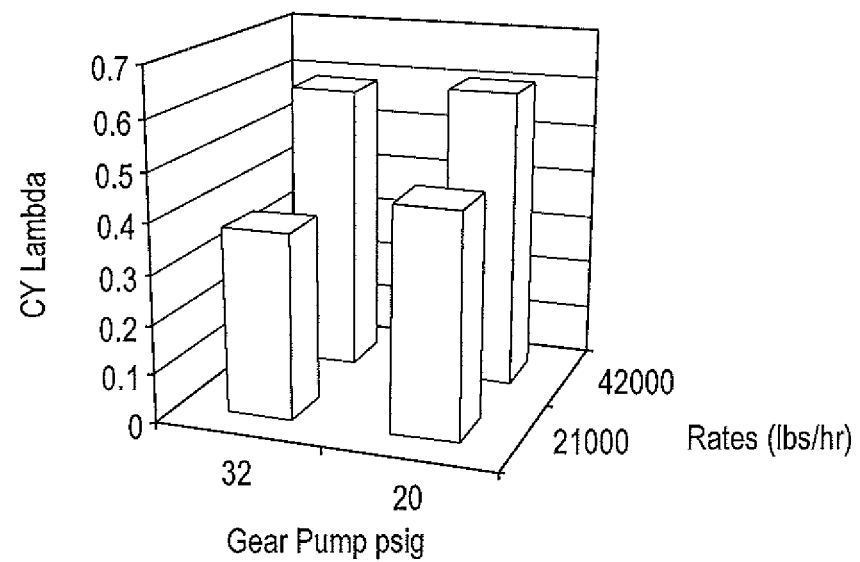

BIMODAL PIPE RESIN AND PRODUCTS MADE THEREFROM

CROSS-REFERENCE TO RELATED APPLICATIONS

This application is a divisional of U.S. application Ser. No. 12/777,553 filed on May 11, 2010, now U.S. Pat. No. 8,110,644, which is a divisional of U.S. application Ser. No. 11/774,255, filed Jul. 6, 2007, now abandoned, which claims the benefit of U.S. Provisional Application No. 60/830,173, filed Jul. 11, 2006, now expired.

FIELD

Embodiments of the present invention relate generally to polymeric resins and to end-use products made from such polymeric resins. More particularly, the present invention relates to bimodal polyolefins made from Ziegler-Natta catalysts having certain desirable physical properties, and the end-use products having certain desirable physical properties, derived from such bimodal polyolefins.

The invention also relates to methods optimizing the processing and extrusion of polymer resins, such as in pelletization of polymer fluffs to increase PENT performance in end use products.

BACKGROUND

Polyethylene has been used in the production of various blow molded products, such as bottles and containers. Examples of such products include consumer/household containers, such as detergent bottles, shampoo bottles, bleach bottles, and the like; industrial containers, such as carry cases for hardware/tools, containers for agricultural chemicals, photochemicals, and institutional food products; and industrial parts, such as stadium seating.

Blow molding is accomplished by extruding molten polyethylene resin as a parison or hollow tube into a mold cavity while simultaneously forcing air into the parison so that the parison expands, taking on the shape of the mold. The molten polyethylene cools within the mold until it solidifies to produce the desired molded product.

The blow molded products made from polyethylene or polyethylene blends offer relatively good strength and other performance properties. It is desirable that the final polyethylene or polyethylene blend product exhibits good physical properties such as good drop impact, stiffness, and good PENT.

Therefore, it is desirable to develop a polyethylene resin and blow molded products that are lightweight and have a balance of performance properties, such as drop impact, stiffness, and acceptable PENT.

SUMMARY OF INVENTION

In one aspect, the invention is directed to a bimodal Ziegler-Natta catalyzed polyethylene, having a density of from 0.930 g/cc to 0.960 g/cc, and a molecular weight distribution of from 10 to 25, wherein an article formed from the polymer has a PENT of at least 1500 using test ASTM F 1473. Further, the polyethylene may be a copolymer.

In another aspect, the polyethylene has a density of from 0.946 g/cc to 0.951 g/cc. In an additional aspect, the polyethylene fluff is extruded into pellets using a specific energy input (SEI) of less than 300 kW·h/ton.

In an aspect, the polyethylene is produced by contacting ethylene with a Ziegler-Natta catalyst produced by contacting an alkyl magnesium compound with an alcohol to form a magnesium dialkoxide compound; contacting the magnesium dialkoxide compound with a first agent selected from $ClTi(O^{i}Pr)_3$, $ClSi(Me)_3$ and combinations thereof, to form a reaction product "A"; contacting the reaction product "A" with a second agent comprised of $TiCl_4/Ti(OBu)_4$ to form reaction product "B"; contacting the reaction product "B" with a third agent comprised of $TiCl_4$ to form reaction product "C"; contacting the reaction product "C" with a fourth agent comprised of $TiCl_4$ to form reaction product "D"; and then contacting the reaction product "D" with a fifth agent selected from TMA, TIBAl, TEAl, n-octyl aluminum, n-hexyl aluminum and combinations thereof, to form the catalyst. Also disclosed in an article formed from the bimodal polyethylene.

The polyethylene may be produced in one or more slurry phase reactors, one or more gas phase reactors, or one or more solution phase reactors.

A further aspect of the invention is directed to a method of preparing a pipe or tubing, including: obtaining a bimodal polyethylene, having a density of from 0.930 g/cc to 0.960 g/cc, and a molecular weight distribution of from 10 to 25, and processing the polyethylene under conditions in which a specific energy input (SET) is less than 300 kW·h/ton, and forming a pipe or tubing article, wherein the article has a PENT of at least 1500. In other aspects, the polyethylene is processed under conditions in which a specific energy input (SEI) is from 150 to 250 kW·h/ton, or from 150 to 200 kW·h/ton.

In a further aspect, the pipe or tubing has a PENT of at least 3000.

The disclosed method may also include controlling a suction pressure and a throughput of an extruder so that the Mz of the polyethylene in a pellet or tubing is within 10% of the Mz before the processing of a polyethylene fluff.

In an aspect, a Ziegler-Natta catalyst is used to produce the polyethylene. In a further aspect, the Ziegler-Natta catalyst is produced by a process comprising: contacting an alkyl magnesium compound with an alcohol to form a magnesium dialkoxide compound; contacting the magnesium dialkoxide compound with a first agent selected from $ClTi(O^{i}Pr)_3$, $ClSi(Me)_3$ and combinations thereof, to form a reaction product "A"; contacting the reaction product "A" with a second agent comprised of $TiCl_4/Ti(OBu)_4$ to form reaction product "B"; contacting the reaction product "B" with a third agent comprised of $TiCl_4$ to form reaction product "C"; contacting the reaction product "C" with a fourth agent comprised of $TiCl_4$ to form reaction product "D"; and contacting the reaction product "D" with a fifth agent selected from TMA, TIBAl, TEAl n-octyl aluminum, n-hexyl aluminum and combinations thereof, to form the catalyst.

Another aspect of the invention is a method for controlling the degradation of polyethylene that includes: polymerizing ethylene monomer, recovering polyethylene, extruding the polyethylene, and controlling the degradation of the polyethylene during the extrusion by measuring the specific energy input (SET) to the extruder and adjusting a process parameter selected from the group consisting of throughput, gear suction pressure, and a combination thereof to control SEI to less than 300 kW·h/ton, and forming an article. The article may comprises pellets and/or may further comprise a tubular member or pipe.

In an aspect, the article has a PENT of at least 1500 using test ASTM F 1473.

In this method, the PENT is increased as compared to a method otherwise identical except that the SEI is not controlled to less than 300 kW·h/ton.

The method may also include measuring Mz and controlling the SEI to minimize the change in Mz of the polymer to less than 10% of an Mz of the polymer before extrusion.

BRIEF DESCRIPTION OF THE DRAWINGS

FIG. 9 is a schematic plot of Carreau-Yasuda results (rate and suction pressure changes).

DETAILED DESCRIPTION

Definitions

Figure 1:
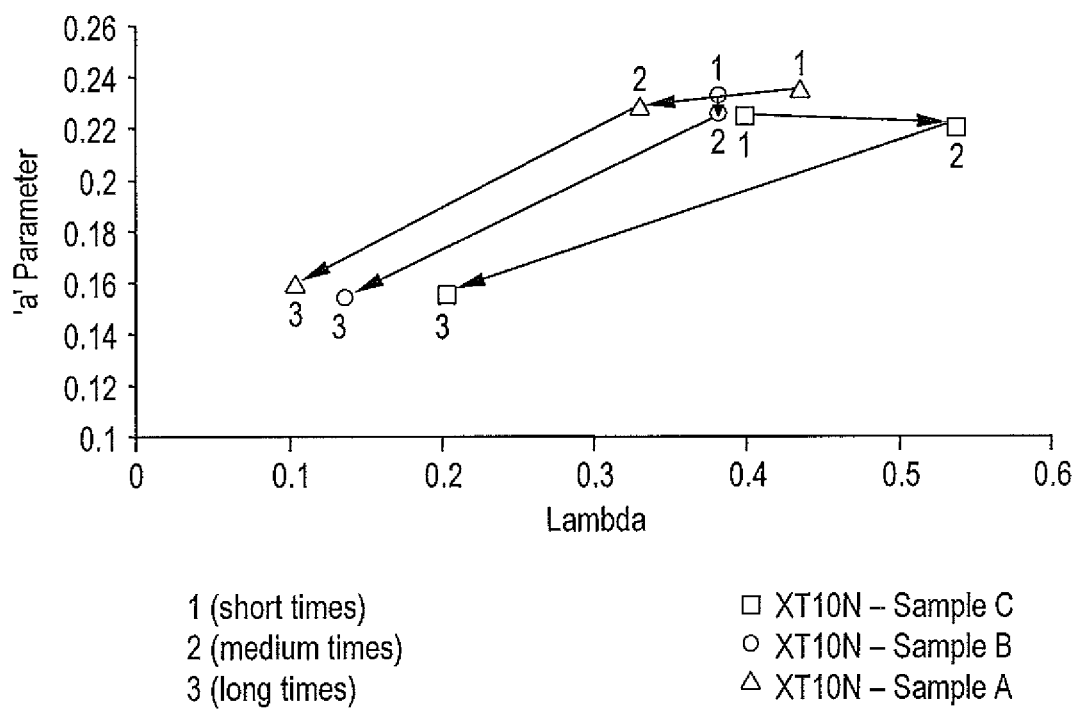
FIG. 1 is a schematic plot of Lambda versus 'a' Parameter for XT10N bimodal polyethylene samples.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

The term "activity" refers to the weight of product produced per weight of the catalyst used in a process per hour of reaction at a standard set of conditions (e.g., grams product/gram catalyst/hr).

The term "substituted" refers to an atom, radical or group that replaces a hydrogen in a chemical compound.

The term "blend" refers to a mixture of compounds that are blended and/or mixed prior to contact with another compound.

As used herein, "density" is measured via ASTM-D-792.

As used herein, "melt flow index" is measured via ASTM-D-1238-01 (Method A—Cut and Weigh).

As used herein, "Environmental Stress Crack Resistance (ESCR) for resin" is measured via ASTM-D-1693, Condition B.

As used herein, "flexural modulus" is measured via ASTM-D-790, and may be referred to as "stiffness".

The term "equivalent" refers to a molar ratio of two components.

As used herein, "molecular weight distribution" is the ratio of the weight average molecular weight to the number average molecular weight (Mw/Mn) of a polymer.

As used herein, "room temperature" includes a temperature of from about 20° C. to about 28° C. (68° F. to 82° F.) However, room temperature measurements generally do not include close monitoring of the temperature of the process and therefore such a recitation does not intend to bind the embodiments described herein to any predetermined temperature range. Furthermore, a temperature difference of a few degrees does not matter to the phenomenon under investigation, such as a preparation method.

As used herein, "bimodal" refers to a polymerization process for producing a bimodal resin having a distinct low molecular weight portion and a distinct high molecular weight portion.

As used herein, "copolymer" refers to any polymeric material comprising two or more different monomers.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Ziegler-Natta catalyst systems are generally formed from the combination of a metal component (e.g., a catalyst precursor) with one or more additional components, such as a catalyst support, a cocatalyst and/or one or more electron donors, for example.

A specific example of a Ziegler-Natta catalyst includes a metal component generally represented by the formula:

$$MR^A_x;$$

wherein M is a transition metal, $R^A$ is a halogen, an alkoxy or a hydrocarboxyl group and x is the valence of the transition metal. For example, x may be from 1 to 4.

The transition metal may be selected from Groups IV through VIB (e.g., titanium, vanadium or chromium), for example. $R^A$ may be selected from chlorine, bromine, carbonates, esters, or alkoxy groups in one embodiment. Examples of catalyst components include $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H)_2Br_2$ and $Ti(OC_{12}H_{25})Cl_3$, for example.

Those skilled in the art will recognize that a catalyst may be "activated" in some way before it is useful for promoting polymerization. As discussed further below, activation may be accomplished by contacting the catalyst with a Ziegler-Natta activator (Z-N activator), which is also referred to in some instances as a "cocatalyst." Embodiments of such Z-N activators include organoaluminum compounds, such as trimethyl aluminum (TMA), triethyl aluminum (TEAL), tri-n-octylaluminum (TNOAl), and triisobutyl aluminum (TIBAl), for example.

The components of the Ziegler-Natta catalyst system (e.g., catalyst, activator and/or electron donors) may or may not be associated with a support, either in combination with each other or separate from one another. The Ziegler-Natta support materials may include a magnesium dihalide, such as magnesium dichloride or magnesium dibromide, or silica, for example.

Prior efforts to form the Ziegler-Natta catalyst generally included the methods described below. (See, U.S. Pat. No. 6,734,134 and U.S. Pat. No. 6,174,971, which are incorporated by reference herein.)

A representative, non-limiting, illustration of a possible reaction scheme may be illustrated as follows:

$$MgR^1R^2 + 2R^3OH \rightarrow Mg(OR^3)_2 \quad \quad 1)$$

$$Mg(OR^3)_2 + ClA(O_xR^4)_y \rightarrow \text{``A''} \quad \quad 2)$$

$$\text{``A''} + TiCl_4/Ti(OR^5)_4 \rightarrow \text{``B''} \quad \quad 3)$$

$$\text{``B''} + TiCl_4 \rightarrow \text{``C''} \quad \quad 4)$$

$$\text{``C''} + TiCl_4 \rightarrow \text{``D''} \quad \quad 5)$$

$$\text{``D''} + AR^6{}_3 \rightarrow \text{Catalyst} \quad \quad 6)$$

Note that while the primary reaction components are illustrated above, additional components may be reaction products or used in such reactions and not illustrated above. Further, while described herein in terms of primary reaction steps, it is known to those skilled in the art that additional steps may be included in the reaction schemes and processes described herein (e.g., washing, filtering, drying or decanting steps), while it is further contemplated that other steps may be eliminated in certain embodiments. In addition, it is contemplated that any of the agents described herein may be added in combination with one another so long as the order of addition complies with the spirit of the invention. For example, the third and fourth agents may be added to reaction product B at the same time to form reaction product D.

Such methods generally include contacting an alkyl magnesium compound with an alcohol to form a magnesium dialkoxide compound. Such reaction may occur at a reaction temperature ranging from room temperature to about 90° C. for a time of up to about 10 hours, for example.

The alcohol may be added to the alkyl magnesium compound in an equivalent of from about 0.5 to about 6 or from about 1 to about 3, for example.

The alkyl magnesium compound may be represented by the following formula:

$$MgR^1R^2;$$

wherein $R^1$ and $R^2$ are independently selected from $C_1$ to $C_{10}$ alkyl groups. Non-limiting illustrations of alkyl magnesium compounds include butyl ethyl magnesium (BEM), diethyl magnesium, dipropyl magnesium and dibutyl magnesium, for example.

The alcohol may be represented by the formula:

$$R^3OH;$$

wherein $R^3$ is selected from $C_2$ to $C_{20}$ alkyl groups. Non-limiting illustrations of alcohols generally include butanol, isobutanol and 2-ethylhexanol, for example.

The method then includes contacting the magnesium dialkoxide compound with a first agent, or halogenating agent, to form reaction product "A".

Such reaction may occur in the presence of an inert solvent. A variety of hydrocarbons can be used as the inert solvent, but any hydrocarbon selected should remain in liquid form at all relevant reaction temperatures and the ingredients used to form the supported catalyst composition should be at least partially soluble in the hydrocarbon. Accordingly, the hydrocarbon is considered to be a solvent herein, even though in certain embodiments the ingredients are only partially soluble in the hydrocarbon.

Suitable hydrocarbon solvents include substituted and unsubstituted aliphatic hydrocarbons and substituted and unsubstituted aromatic hydrocarbons. For example, the inert solvent may include hexane, heptane, octane, decane, toluene, xylene, dichloromethane, chloroform, 1-chlorobutane or combinations thereof, for example.

The reaction may further occur at a temperature of from about 0° C. to about 100° C. or from about 20° C. to about 90° C. for a time of from about 0.2 hours to about 24 hours or from about 1 hour to about 4 hours, for example.

Non-limiting examples of the first agent are generally represented by the following formula:

$$ClA(O_xR^4)_y;$$

wherein A is selected from titanium, silicon, aluminum, carbon, tin and germanium, $R^4$ is selected from $C_1$ to $C_{10}$ alkyls, such as methyl, ethyl, propyl and isopropyl, x is 0 or 1 and y is the valence of A minus 1. Non-limiting illustrations of first agents include chlorotitaniumtriisopropoxide (ClTi(O$^i$Pr)$_3$) and ClSi(Me)$_3$, for example.

The method then includes contacting reaction product "A" with a second agent, or halogenating/titanating agent to form reaction product "B".

Such reaction may occur in the presence of an inert solvent. The inert solvents may include any of those solvents previously discussed herein, for example.

The reaction may further occur at a temperature of from about 0° C. to about 100° C. or from about 20° C. to about 90° C. for a time of from about 0.2 hours to about 36 hours or from about 1 hour to about 4 hours, for example.

The second agent may be added to reaction product "A" in an equivalent of from about 0.5 to about 5, or from about 1 to about 4 or from about 1.5 to about 2.5, for example.

The second agent may be represented by the following formula:

$$TiCl_4/Ti(OR^5)_4;$$

wherein $R^5$ is selected from $C_2$ to $C_{20}$ alkyl groups. Non-limiting illustrations of second agents include blends of titanium chloride and titanium alkoxides, such as TiCl$_4$/Ti(OBu)$_4$. The blends may have an equivalent of TiCl$_4$:Ti(OR$^5$)$_4$ of from about 0.5 to about 6 or from about 2 to about 3, for example.

The method may then include contacting reaction product "B" with a third agent, or halogenating/titanating agent to form reaction product "C".

Such reaction may occur in the presence of an inert solvent. The inert solvents may include any of those solvents previously discussed herein, for example.

The reaction may further occur at room temperature, for example.

The third agent may be added to the reaction product "B" in an equivalent of from about 0.1 to about 5, or from about 0.25 to about 4 or from about 0.45 to about 4.5, for example.

Non-limiting illustrations of third agents include metal halides. The metal halides may include any metal halide known to one skilled in the art, such as titanium tetrachloride (TiCl$_4$), for example. The third agent may be added in a equivalent of from about 0.1 to about 5, or from about 0.25 to about 4 or from about 0.45 to about 4.5, for example.

The method may further include contacting reaction product "C" with a fourth agent, or halogenating/titanating agent, to form reaction product "D".

Such reaction may occur in the presence of an inert solvent. The inert solvents may include any of those solvents previously discussed herein, for example.

The reaction may further occur at room temperature, for example.

The fourth agent may be added to the reaction product "C" in an equivalent of from about 0.1 to about 5, or from about 0.25 to about 4 or from about 0.45 to about 4.5, for example.

Non-limiting illustrations of fourth agents include metal halides. The metal halides may include any metal halide previously described herein.

The method may then include contacting reaction product "D" with a fifth agent to form the catalyst component.

The fifth agent may be added to the reaction product "D" in an equivalent of from about 0.1 to about 2 or from 0.5 to about 1.2, for example.

Non-limiting illustrations of fifth agents include organoaluminum compounds. The organoaluminum compounds may include aluminum alkyls having the following formula:

$$AlR^6_3;$$

wherein $R^6$ is a $C_1$ to $C_{10}$ alkyl compound, Non-limiting illustrations of the aluminum alkyl compounds generally include trimethyl aluminum (TMA), triisobutyl aluminum (TIBAl), triethyl aluminum (TEAl), tri-n-octylaluminum (TNOAl), n-octyl aluminum and n-hexyl aluminum, for example.

As illustrated above, the first agent and the second agent generally include blends of compounds. In addition, a plurality of first agents or second agents may be used and still retain one or more of the beneficial properties obtained via blends. Further, a magnesium metal may be used in place of the alkyl magnesium compounds. (See for example U.S. patent application Ser. No. 11/474,145, filed 23 Jun. 2006, entitled Formation of Ziegler-Natta Catalyst, which is fully incorporated by reference herein).

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. Other monomers include ethylenically unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst and optionally a co-catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process. However, a process may be a bulk process, a slurry process or a bulk slurry process, for example.

In one embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 45 bar and a temperature of from about 38° C. to about 121° C., for example. Reaction heat may be removed through the loop wall via any method known to one skilled in the art, such as via a double-jacketed pipe.

In one embodiment, a slurry process using continuous stirred tank reactors, such as the Hoechst process (see Kirk-Othmer, Encyclopedia of Chemical Technology, Volume 17, $4^{th}$ Edition, pages 735-737 (1996), which is herein incorporated by reference), may be carried out. Hexane is used as the diluent. The reactors may be operated at 75° C. to 95° C. and a total pressure of 1 atm to 12.5 atm, Ethylene comonomer, solvent, catalyst components, and hydrogen are continuously fed into the reactor. Residence time of the catalyst is from 1 to 6 hours. Optionally, hydrogen may be added to the process, such as for molecular weight control of the resultant polymer. Optionally, other monomers, such as butene, may also be added to the process.

In one embodiment, ethylene is polymerized in the presence of a Ziegler-Natta catalyst at elevated temperature and pressure. Polymerization is carried out in a series of polymerization reactors selected from the group of slurry reactors. In one embodiment, the reactor system comprises two continuously stirred tank reactors (CSTR). The reactor system can comprise the reactors in any number and order, and it is also possible to conduct the process in single or multiple loop reactors.

Additionally, there may be included with the polymerization reactors, prereactors, which include any reactor for prepolymerizing the catalyst and for modifying the olefinic feed, if necessary. All reactors may be arranged in series.

The high molecular weight portion and the low or medium molecular weight portion of the resulting bimodal polymer, can be prepared in any order in the reactors, i.e., the low molecular weight portion in the first reactor and the high molecular weight portion in the second reactor, or vise versa. The conditions of the reactor are selected such that 30 wt % to 70 wt %, or 40 wt % to 60 wt %, or 50 wt % of the final product is made in one reactor, with the remaining portion product being formed in the second reactor.

Alternatively, other types of polymerization processes may be used, such stirred reactors in series, parallel or combinations thereof, for example. Upon removal from the reactor, the polymer may be passed to a polymer recovery system for further processing, such as addition of additives and/or extrusion, for example.

Polymer Product

The novel, improved polymers (and blends thereof) formed via the processes described herein may include, but are not limited to, linear low density polyethylene, elastomers, plastomers, high density polyethylenes, low density polyethylenes, medium density polyethylenes, bimodal polyethylenes, and polyethylene copolymers for example.

In one embodiment, ethylene based polymers may have a density of from about 0.930 g/cc to about 0.960 g/cc, or from about 0.940 g/cc to about 0.950 g/cc, or from about 0.946 g/cc to about 0.951 g/cc, for example.

Such ethylene based polymers may have a molecular weight distribution of from 10 to 25, or from 15 to 20, for example.

In one embodiment, the ethylene based polymers may have a flexural modulus, or stiffness, of from 90,000 psi to 200,000 psi, or from 120,000 psi to 170,000 psi, for example.

In one embodiment, the ethylene based polymers have a PENT (Pennsylvania Notch Tensile Test) of at from at least 500 hours to at least 12,000 hours, in a further aspect at least 1500 to 5000 hours, in an additional embodiment from at least 3000 hours to 5000 hours, and in a further aspect from at least 3000 hours to at least 8,000 hours.

In one embodiment, the ethylene based polymers may have a melt flow index (MI 5) of from about 0.1 dg/min to about 0.5 dg/min., or from about 0.20 dg/min. to about –0.30 dg/min., for example.

EXAMPLES

The invention having been generally described, the following examples are provided merely to illustrate certain embodiments of the invention, and to demonstrate the practice and advantages thereof. It is understood that the examples are given by way of illustration and are not intended to limit the scope of the specification or the claims in any manner.

Certain Test Methods were used in determining the physical properties of the resin and the end-use products. Those Test Methods are listed below and are readily available to those of ordinary skill in the art.

Tests run on the resin included melt index using ASTM D1238 (A), and density using ASTM D792, flexural modulus (a calculation of stiffness) using ASTM D790.

In the following examples, the Ziegler-Natta catalyst compounds were prepared in a 500 mL reactor equipped with four Morten's indentions and a dropping funnel, three-blade agitator and septa.

As used herein, "BEM" refers to 20.2 wt. % solution of butylethylmagnesium (0.12 wt. % Al).

As used herein, "EHOH" refers to 2-ethylhexanol.

As used herein, "TNBT" refers to tetra n-butyl titanate.

As used herein, "TEAl" refers to triethyl aluminum.

Example 1

The preparation of the catalyst was achieved by slurrying 100 mmol (54.7 g) of BEM in hexane (total volume 100 ml) and stirring (250 rpm) the mixture at room temperature. In addition, 216 mmol (28.18 g) of EHOH was slurried in 50 mL of hexane and the resulting solution was added dropwise to the BEM solution at room temperature over 30 minutes. The reaction mixture was then stirred at room temperature for another hour.

The preparation then included adding 100 mmol (45 g) of $ClTi(O^iPr)_3$ (2M in hexane) to the mixture at room temperature over 30 minutes. A clear, solid free solution (reaction mixture "A") was obtained. The reaction mixture "A" was then stirred at room temperature for another hour.

In addition, 100 mmol (34.4 g) of TNBT were added to a 250 mL graduated cylinder. 200 mmol (37.04 g) of $TiCl_4$ was then added dropwise to the TNBT mixture at room temperature over 30 minutes to form $2TiCl_4/(OBu)_4$. Hexane was then added to the mixture to provide a mixture volume of 250 mL. The resulting mixture was then allowed to set over 2 hours.

The preparation then included adding the $2TiCl_4/Ti(OBu)_4$ dropwise to the reaction mixture "A" at room temperature over 2 hours to form reaction mixture "B". The reaction mixture "B" was then stirred at room temperature for another hour. The reaction mixture "B" was then decanted and the resulting solids were washed three times with 200 mL of hexane. The solids were then suspended in 200 mL of hexane.

The preparation then included adding 100 mmol (19.0 g) of $TiCl_4$ (diluted to 50 mL in hexane) dropwise to the reaction mixture "B" at room temperature over 20 minutes to form reaction mixture "C". The reaction mixture "C" was then stirred at room temperature for another hour. The reaction mixture "C" was then decanted and the solids were washed with 200 mL of hexane. The solids were then suspended in 200 mL of hexane.

The preparation then included adding 100 mmol (19.0 g) of $TiCl_4$ (diluted to 50 mL in hexane) dropwise to the reaction mixture "C" at room temperature over 20 minutes to form reaction mixture "D". The reaction mixture "D" was then stirred at room temperature for another hour. The reaction mixture "D" was then decanted and the solids were washed three times with 200 mL of hexane. The solids were then suspended in 150 ml of hexane.

The preparation then included adding 16 mmol (7.39 g) of TEAl (25 wt. %) to the reaction mixture "D" at room temperature over 25 minutes to form the catalyst composition.

The catalyst composition was then stirred at room temperature for another hour. The catalyst composition was then decanted and dried, resulting in a yield of about 12 g. A person of ordinary skill in the art can adequately scale the catalyst preparation for any process. The catalyst was then diluted to an appropriate concentration for continuous feeding to maintain a desired production rate.

A production facility having two sets of CSTRs (continuous stirred tank reactors) in series was operated as follows: the first reactor was operated at 185° F. (85° C.) and 119 psig (8.2 bar). Ethylene, hydrogen, and hexane were continuously introduced into the reactor, together with the polymerization catalyst ($5.5 \times 10^{-3}$ wt % based on hexane) and cocatalyst (TNOAl) ($1.1 \times 10^{-1}$ wt % based on hexane). The volumes in the first reactor was 0.55 lbs per hour per gal, with a residency time of from 2 to 4 hours. The volumes in the second reactor was 0.54 lbs per hour per gal, with a residency time of from 1 to 2 hours.

The polymer was introduced into the second reactor, operated at 176° F. (80° C.) and 32 psig (2.2 bar). Additional ethylene was added, along with butene comonomer. The reactor conditions in both reactors were such that 51.3% conversion of ethylene was obtained in the first reactor, 48.7% conversion of ethylene was obtained in the second reactor, and an $MI_5$ of 500 dg/min was obtained in the first reactor. $MI_5$ is for 5 kg weight used in test. $MI_{21.6}$ or HLMI is for High Load Melt Index.

Reactor conditions and polymer withdrawal rate were such that materials according to Table 1 were obtained. These properties were determined using the standard ASTM melt index tests.

TABLE 1

Production Conditions and Product Properties

| Condition/Property | Example 1 |
|---|---|
| Reactor One Temperature (° F.) | 185 |
| Reactor One Pressure (psig) | 119 |
| Reactor One $MI_5$ (dg/min) | 498 |
| Reactor Two Temperature (° F.) | 176 |
| Reactor Two Pressure (psig) | 32 |
| Reactor Two $MI_5$ (dg/min) | 0.72 |
| Pellet\$MI_5$ (dg/min) | 0.26 |
| Butene (lbs C4/lbs C2) | 0.042 |
| Powder Density (g/cc) | 0.9469 |
| Pellet Density (g/cc) | 0.9485 |

As used herein, "HDPE XT10N" is an embodiment of the high density polyethylene produced by the foregoing catalyst and process, which is made by Total Petrochemicals USA, Inc. In an aspect, XT10N has the following properties (on the average): a MFI (HLMI) of from 6.3 to 8.7 g/10 min (ASTM Method D 1238), a density of from 0.9475 to 0.9505 g/cm³, and a PENT of at least 1500 to 3000, using ASTM Method F 1473.

Comparative resins were also studied and have been referenced herein, such as 3344N which is a high density bimodal polyethylene (HDPE) sold by Total Petrochemicals USA, Inc. 3344N is made by another catalyst system and method and has the following properties: (on the average): a MFI (HLMI) of from 7.8 to 10.2 g/10 min (ASTM Method D 1238), a density of from 0.9455 to 0.9485 g/cm³, and a PENT of at least 500, using ASTM Method F 1473.

Processing of Produced Polymer

The present invention relates generally to the manufacture of plastics materials, particularly, polymers which are sensitive to processing. Many types of polymers are produced from a polymerization reactor as a fluff, coarse powder, or granules that are then usually melted and extruded into pellets. When a bimodal polyethylene fluff, which consists of high and low molecular weight fractions, is compounded on a twin screw extruder, it is necessary to control the amount of energy input in the material during the processing conditions used to produce resin pellets to find the optimum balance between sufficient mixing and problematic polymer degradation.

If the shear or energy input is too low, then the high and low molecular weight fractions are not mixed, resulting in gels and non-maximized mechanical, processing, and physical properties such as long term hydrostatic testing, PENT (Pennsylvania Notch Test), bubble stability. Conversely, if the shear or energy input is too high, then excessive degradation occurs and the processing and mechanical properties of the polymer are lowered; this is especially undesirable for certain end use applications such as for piping and tubing.

The performance of a product made from a bimodal polyethylene (PE) resin has been shown to be directly related to the proper mixing of the low and high molecular weight components, which can be achieved by increasing shear or residence time within the extruder. Studies presented herein show that high shear, longer residence time, and high temperature lead to polymer degradation detrimental to the product performance. Thus, it is necessary to control the amount of energy inputs in the resin material to find an optimum between mixing and polymer degradation.

Differences in pellets sizes were observed in a bimodal polyethlyene material used to make pipe; some pellets were larger than others. Upon analysis, the bigger pellets were found to have a degraded Mz section. Upon further testing, it was found that even a small amount of degraded big pellets can be very detrimental to the PENT properties. There is strong evidence that this degraded portion of material is created in extrusion. Indeed, when the fluff of this material is extruded in two different machines with different shear, the PENT of the resulting can be increased from 1,000 hours to a over 5000 hours.

It has been found that it is possible to optimize the material properties by properly adjusting any flow-obstructing devices that affect or have the result of changing the internal state of the extruder. Flow obstructing devices may include direct obstruction such as physical devices (e.g., gates), but also include indirect obstructions such as devices that can result in pressure changes (e.g., gear pump speed variations leading to changes in extruder upstream pressure, and screen packs). Of course the features and attributes of extruders vary, and thus these concepts also apply to other types of flow obstructing devices known to one skilled in the art that are used during the processing of polymers.

Using different flow obstruction settings in the extruder that change the shear history inside the machine can reduce the portion of degraded material (i.e., number of big pellets). A reduction of suction pressure was found to achieve a significant reduction of big pellet tail, i.e., degraded pellets. And, as the suction pressure decreases, the specific energy input (SEI) on the rotor decreases. The PENT of the material was also shown to increase with the decrease in suction pressure.

Importantly, it has been found in studies herein that the (SEI) and mixing are critical factors, otherwise some pellets can be produced which are degraded or otherwise different than the rest of the resin material that can greatly affect or even destroy the properties of a critical resin such as those used for pipe, tubing, and rotomolding. In one scenario, for example, a small portion or area of different material can create one or more "weak spots" or imperfections that affect the strength, crack resistance, and other physical properties of the pipe.

Some prior art hardware solutions have been used to reduce degradation in extruders used to make pellets. Those solutions focused upon obtaining a good homogeneity of the melt residence time and suppressing almost, if not all, potential radical initiator leak (oxygen) in the system. Also, Kobe Steel has suggested that degradation problems be solved by making large suction pressure adjustments or modifying the rotor discharge wings.

Beyond hardware modification, several parameters such as suction pressure, screw speed, production rate and gate position can help improve pellet homogeneity. Poor pellet homogeneity was demonstrated to be connected to material degradation. In order to improve homogeneity, Kobe has recommended that certain report extruders should be run under the following conditions: low suction pressure, low screw RPM, low production rate and closed gate.

The effect of processing equipment, such as a pellet extruder, on the material properties and bimodal polyethylene (PE) material degradation was also investigated. Thus, a study of the effect of the shear rate and temperature on bimodal PE pipe material was undertaken to help understand how to limit the degradation phenomenon. The experimental studies presented herein were performed on a lab scale twin-screw extruder and a Kobe twin-screw extruder used in commercial production (MIXTRON LCM 450G from KOBE STEEL LTD). The concepts presented herein would also apply to other types and brands of extruders and processing equipment used to process fluff or resins or to make resin pellets. It is also believed that other types of PE material as well as other types of polymers and copolymers including but not limited to polypropylene and other polyolefins may also be similarly affected during extrusion.

The calculation of the specific energy input (SEI) given by the extruder to the resin is one way to evaluate degradation in the material. There are many ways to calculate SET that are known to one skilled in the art. Further some of the parameters are dependent upon the type of extruder used. One non-limiting example of how to calculate SEI is set forth herein. Calculations show that on extruder #1, a Kobe Model MIXTRON LCM 450G from KOBE STEEL LTD, the SEI range varies from 0.07 to 0.14 kW·h/pound, or 154 to 308 kW·h/ton. This specific energy input varies mostly with throughput and there is evidence that the usual SEI value on the Kobe extruder under normal operating condition is in the order of 185 kW·h/ton. During the production of XT10N Sample E polyethylene (at ½ rate) under a SEI of approximately 300 kW·h/ton, extreme material degradation was observed. No such observation could be made by in other twin screw extruders where an SEI of up to 310 kW·hr/ton could be used without visible sign of degradation. In these trials an SEI of 300 kW·h/ton was considered to be the onset of degradation.

In order to limit the degradation of the polymer and to optimize PENT, in an aspect, the SEI is below 300 kW·h/ton. In a further aspect, the SEI is from 150 to 250 kW·h/ton, and yet another aspect the SEI is from 150 to 200 kW·h/ton, and in yet a further aspect is less than 185 kW·h/ton.

It appears that the maximum shear rate in the Kobe extruder occurs between the two non-intermeshing rotors. Equation 1 displays the maximum shear rate between the two rotors. This corresponds to a shear rate range of $900 \pm s^{-1}$ for a clearance of $9.5 \pm 0.5$ mm.

Max Shear Rate in Rotor  Equation 1

$$\text{Shear rate} = \frac{3.14 \times \Phi \times RPS}{e}$$

$$= 900 \pm 30 \text{ s}^{-1} \text{ for an approximate 9.5 mm clearance}$$

Where $\Phi$ is the diameter of the mixer, RPS the number of revolution per second of the rotor, and e the tip clearance.

The gear pump (SEI) can be calculated with Equation 2.

SEI in a Gear pump  Equation 2

$$SEI_{DCgearpump} = \frac{\text{Volt} \times \text{Amps} \times \text{eff}}{\text{Throughput}} \text{ with } \text{eff}$$

$$= 0.93 \text{ as per manufacturer data.}$$

The hydraulic horsepower in the Kobe gear pump can be calculated with Equation 3.

Hydraulic Horsepower in the Kobe Gear Pump  Equation 3

$$HP = \frac{\text{LB/HR} \times PSI}{857{,}000 \times SG}$$

Where HP is the hydraulic horsepower, LB/HR is the throughput in pounds per hour, and SG is the specific gravity. Knowing the total HP of the gear pump, it is possible to compute the frictional energy input, as per Equation 4 and Equation 5. The hydraulic input is small compared to the frictional input (100 versus 670 kW) and the specific energy input submitted to the polymer in the gear pump is in the order of magnitude of 28 kWh/ton. The rotor submits an order of magnitude of 180 kWh/ton to the polymer. The energy delivered by the gear pump represents approximately $\frac{1}{6}^{th}$ of that of the Kobe.

Frictional Input in the Gear Pump  Equation 4

Frictional kW = total energy − $HP$ $$= \left( SEI \text{ in} \frac{\text{kWh}}{\text{ton}} \times Tput \text{ in} \frac{\text{ton}}{\text{h}} \right) - HP \times 0.746$$

$$33 \times 20.4 - \frac{45{,}000 \times 2{,}400}{857{,}000 \times 0.96} \times 0.746 = 673 - 98$$

$$= 575 \text{ kW}$$

Frictional energy input in the gear pump  Equation 5

$$SEI_{GP\text{-}polymer} = \frac{\text{Frictional kW}}{Tput} = 28 \text{ kWh/ton}$$

SEI in the Gear Pump  Equation 6

$$SEI_{GP\text{-}polymer} = \frac{\text{Frictional kW}}{Tput} = 28 \text{ kWh/ton}$$

Example 2

Effect of Feed Rate on PENT

The feed rate, screen pack, and processing temperatures may also affect some properties and material more than others. As seen in Table 2, excessive degradation as a result of lower feed rate and higher RPM lead to lower PENT performance from 55 to 500 hours for bimodal material XT10N (Sample C). "SCG" refers to slow crack growth performance.

TABLE 2

PENT Performance as a Result of Feed Rate and Rotational Screw Speed (RPM)

| Brabender-Extruded | density | melt flow | Current PENT time | Comments |
|---|---|---|---|---|
| XT10N - Sample B - Brabender (0 pass) | 0.948 | | 2700 | Y |

TABLE 2-continued

PENT Performance as a Result of Feed
Rate and Rotational Screw Speed (RPM)

| Brabender-Extruded | density | melt flow | Current PENT time | Comments |
|---|---|---|---|---|
| XT10N - Sample B - 40 rpm | 0.9487 | 0.23 | 568 | "Little SCG" |
| XT10N - Sample B - 120 rpm/100% | 0.9487 | 0.20 | 500 | Slight |
| XT10N - Sample B - 120 rpm/50% | 0.9492 | 0.24 | 75 | Failed |
| XT10N - Sample A - 40 rpm | 0.950 | 0.32 | 832 | None |
| XT10N - Sample A - 120 rpm/100% | 0.950 | 0.31 | 424 | "very slight SCG" |
| XT10N - Sample A - 120 rpm/50% | 0.950 | 0.31 | 832 | "very slight SCG" |
| XT10N - Sample C - 40 rpm | 0.9484 | 0.24 | 520 | None |
| XT10N - Sample C - 120 rpm/100% | 0.9485 | 0.22 | 208 | None |
| XT10N - Sample C - 120 rpm/50% | 0.9486 | 0.23 | 55 | Failed |

The feed rate, screen pack, and processing temperatures may also affect some properties and material more than others. As seen in Table 2, excessive degradation as a result of lower feed rate and higher RPM lead to lower PENT performance for bimodal material XT10N.

Example 3

Effect of Residence Time

Experiments performed on a DSM compounder molder show that materials subjected to a constant shear for longer periods of time is more prone to polymer degradation. The samples extruded with "long" (20 minutes), "medium" (10 minutes), and "short" (3 minutes) extrusion times are presented in Table 3 and FIG. 1.

TABLE 3

GPC and Rheological Data as a Result of Extrusion Time

| Sample | Mw [kg/mol] | Mz [kg/mol] | Mn [kg/mol] | Mw/Mn | a | Lambda [sec] | Viscosity [Pas] |
|---|---|---|---|---|---|---|---|
| XT10N - Sample C; Short Times | 244 | 1414 | 13 | 18.8 | 0.225 | 0.399 | 5.02E+05 |
| XT10N - Sample C; Med Times | 251 | 1535 | 13 | 19.3 | 0.221 | 0.538 | 6.77E+05 |
| XT10N - Sample C; Long Times | 138 | 604 | 12 | 11.5 | 0.156 | 0.203 | 8.72E+05 |
| XT10N - Sample B; Short Times | 250 | 1610 | 13 | 19.2 | 0.233 | 0.382 | 4.53E+05 |
| XT10N - Sample B; Med Times | 206 | 1137 | 13 | 15.8 | 0.226 | 0.382 | 4.85E+05 |
| XT10N - Sample B; Long Times | 117 | 520 | 12 | 9.7 | 0.155 | 0.136 | 6.96E+05 |
| XT10N - Sample A; Short Times | 248 | 1512 | 14 | 17.7 | 0.235 | 0.435 | 4.51E+05 |
| XT10N - Sample A; Med Times | 173 | 880 | 14 | 12.4 | 0.228 | 0.330 | 3.78E+05 |
| XT10N - Sample A; Long Times | 119 | 555 | 13 | 9.1 | 0.159 | 0.105 | 4.62E+05 |

With increased residence time from 3 to 20 minutes, the breadth and relaxation time drop significantly. There is also a significant decrease in the Mw and Mz with increased processing time. Also, the molecular weight distribution (Mw/Mn) becomes narrower as processing time is increased, indicating that the polymer is degraded.

Another way to evaluate and minimize the degradation of the polymer is process the polymer in a manner in which there is no more than about a 10% change in the Mz as compared with the Mz of the polymer prior to processing (e.g. polymer fluff, polymer pellets). In another aspect, the polymer should be processed so that there is no more than from 5-10% change in the Mz as compared with the Mz of the pre-processed polymer material, and in other aspects no more than from 5-10% change in the Mz as compared with the Mz of the pre-processed polymer material, and in a further aspect less than 8% change in the Mz.

Example 4

Influence of the Suction Pressure on Pipe Performance

A study of the effect of an indirect flow obstruction device, such as gear pump suction pressure, on another type of bimodal polyethylene pipe material made by Total Petrochemicals, USA was also performed. The material used in this study is a bimodal pipe material having properties that are displayed in Table 4.

TABLE 4

QC Properties for Bimodal Pipe Material 3344N

| Lot | MI2 | MI5 | HLMI | SR5 | SR2 | D, g/cm3 | Gel # | YI0 |
|---|---|---|---|---|---|---|---|---|
| D40711004 | 0.087 | 0.33 | 11.4 | 35 | 131 | 0.9464 | −0.36 | −3.78 |

Melt indexes (MI2 and MI5) are in dg/min.

The suction pressure during the extrusion of the 3344N pipe material was reduced from 33-psi to 28, 22 and 15-psi, thereby indirectly decreasing the flow obstruction in the extruder. The resins were tested for pellet weight distribution, and PENT. As the suction pressure is reduced, the amps on the extruder are reduced.

Figure 2:
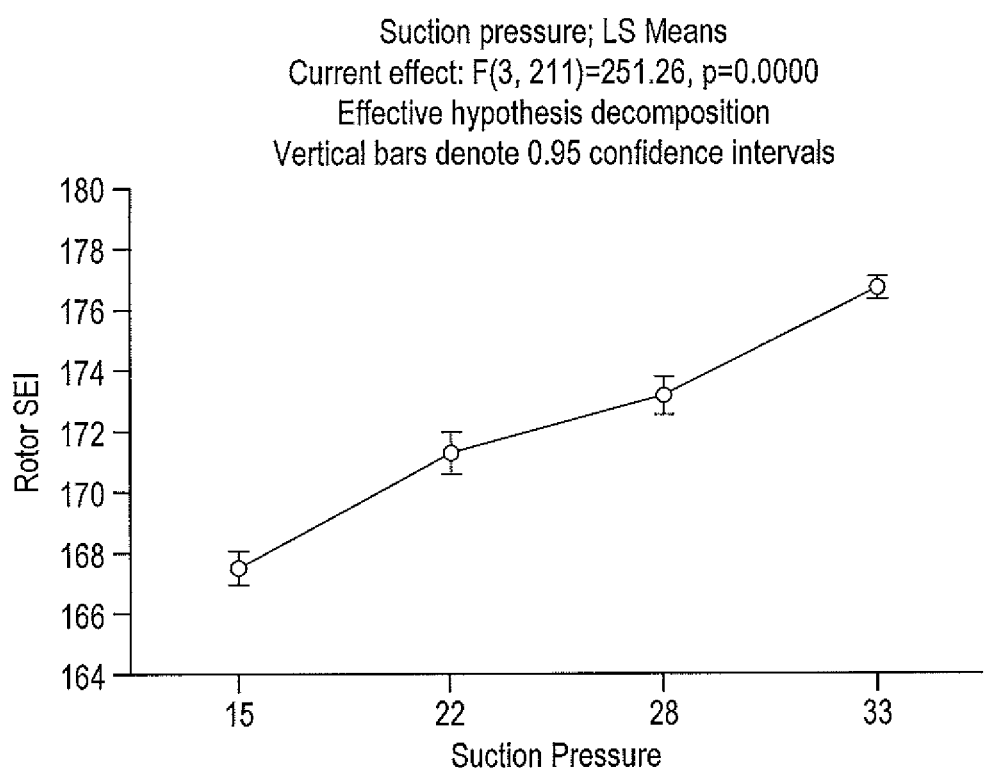
FIG. 2 is a schematic plot of the ANOVA of the rotor specific energy input (SEI) versus the suction pressure (SP)

FIG. 2 shows the ANOVA of the rotor specific energy input (SEI) versus the suction pressure (SP). As the SP decreases, the SEI also decreases significantly. When the suction pressure is reduced there is less back flow in the second chamber of the extruder, which explains the SEI variation.

Figure 3:
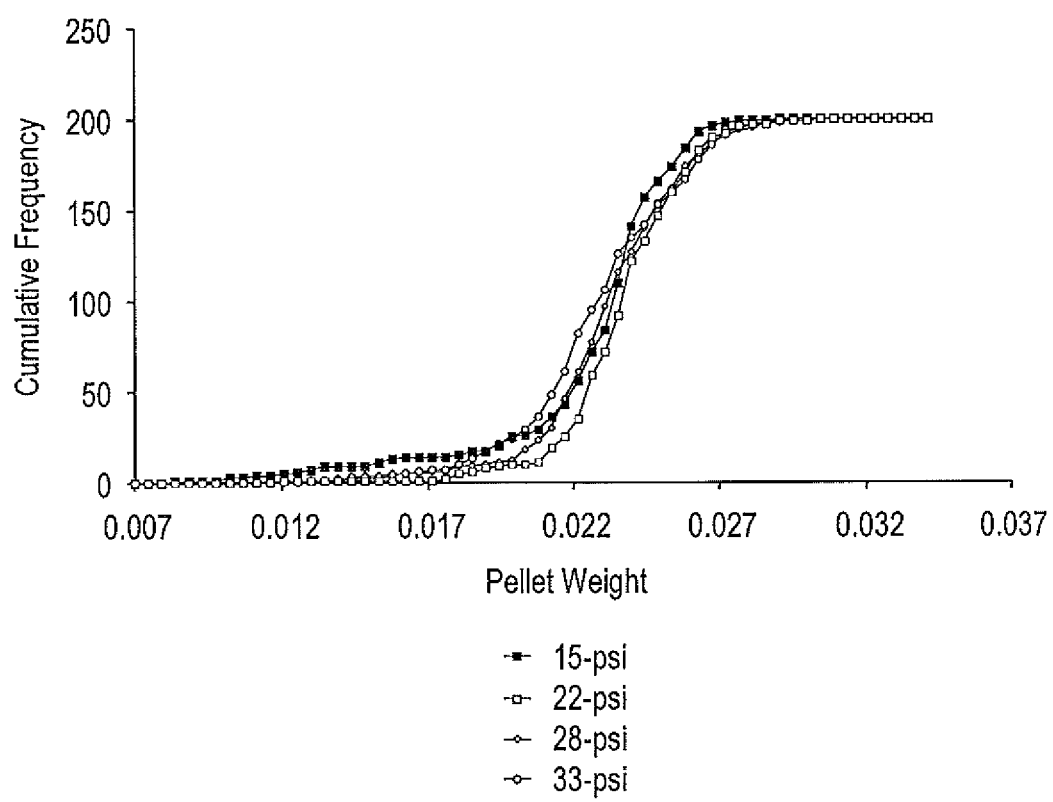
FIG. 3 is a schematic plot that shows the pellet weight distribution of bimodal polyethylene for four different suction pressures.

FIG. 3 shows the pellet weight distribution for four different suction pressures. The pellet average weights are within standard deviation for all the suction pressures, at 0.023±0.001 [g]. The tail of big pellets is visibly reduced only for the suction pressure of 15-psi.

Figure 4:
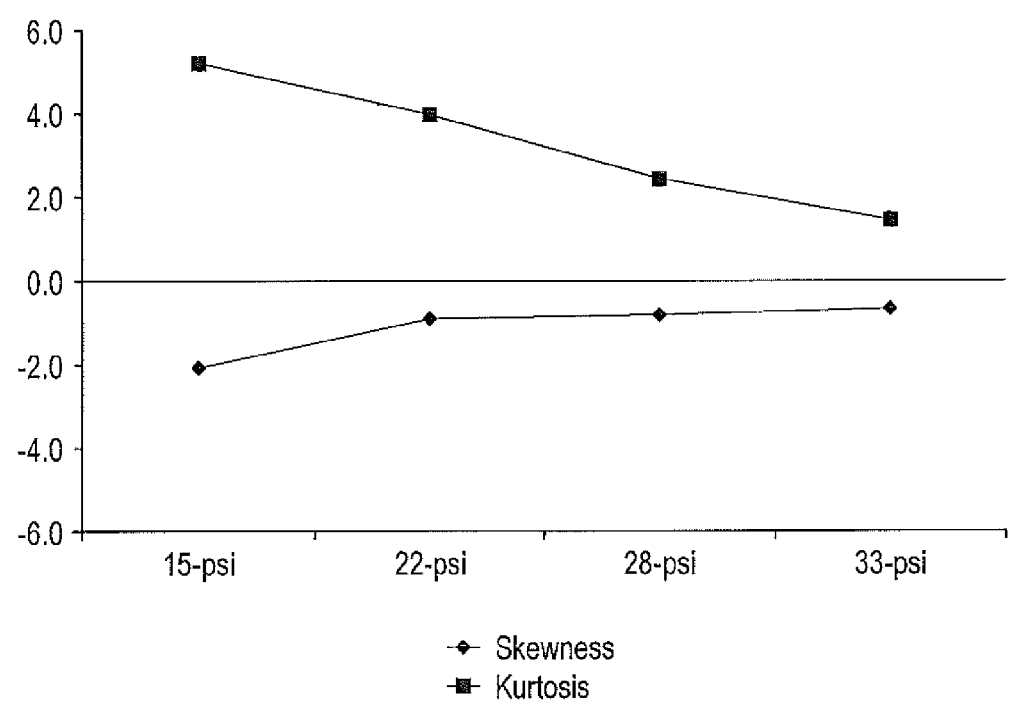
FIG. 4 is a schematic plot that shows the pellet skewness and kurtosis for bimodal polyethylene.

FIG. 4 shows the pellet skewness and kurtosis. As the suction pressure is reduced, the distribution skewness is reduced and the distribution kurtosis is enlarged. This indicates that, compared to a normal distribution, the suction pressure reduction has the effect of shifting the distribution toward the lower values and to narrow it (to show more peak). This is consistent with the removal of the big pellet tail observed in FIG. 3. The skewness also indicates that a reduction of the suction pressure to 15-psi is necessary to achieve a step change in the distribution.

In this study, the reduction in the suction pressure to 15-psi provided the most pronounced effect on the pellet distribution and SEI.

Example 5

Influence of Feed Rate on PENT Performance of XT10N

Complementary data performed at a given suction pressure for two different feed rates (low/high) shows that the PENT data for XT1ON increases with increasing throughput from 490 hours at 21,000 lbs/hr to 2110 hours at 42,000 lbs/hr. See Table 5.

TABLE 5

PENT Failure Time [hours]

| Samples | Density | PENT failure time [hours] |
| --- | --- | --- |
| XT10N Sample B - 42000 lbs/hr 32 psi | 0.9489 | 2110 |
| XT10N Sample B - 21000 lbs/hr 32 psi | 0.9490 | 490 |

Example 6

Effect of Suction Pressure on Pellet Size Distribution

Pellet size differences were observed in the XT10N bimodal polyethlylene material used to make pipe.

Figure 5:
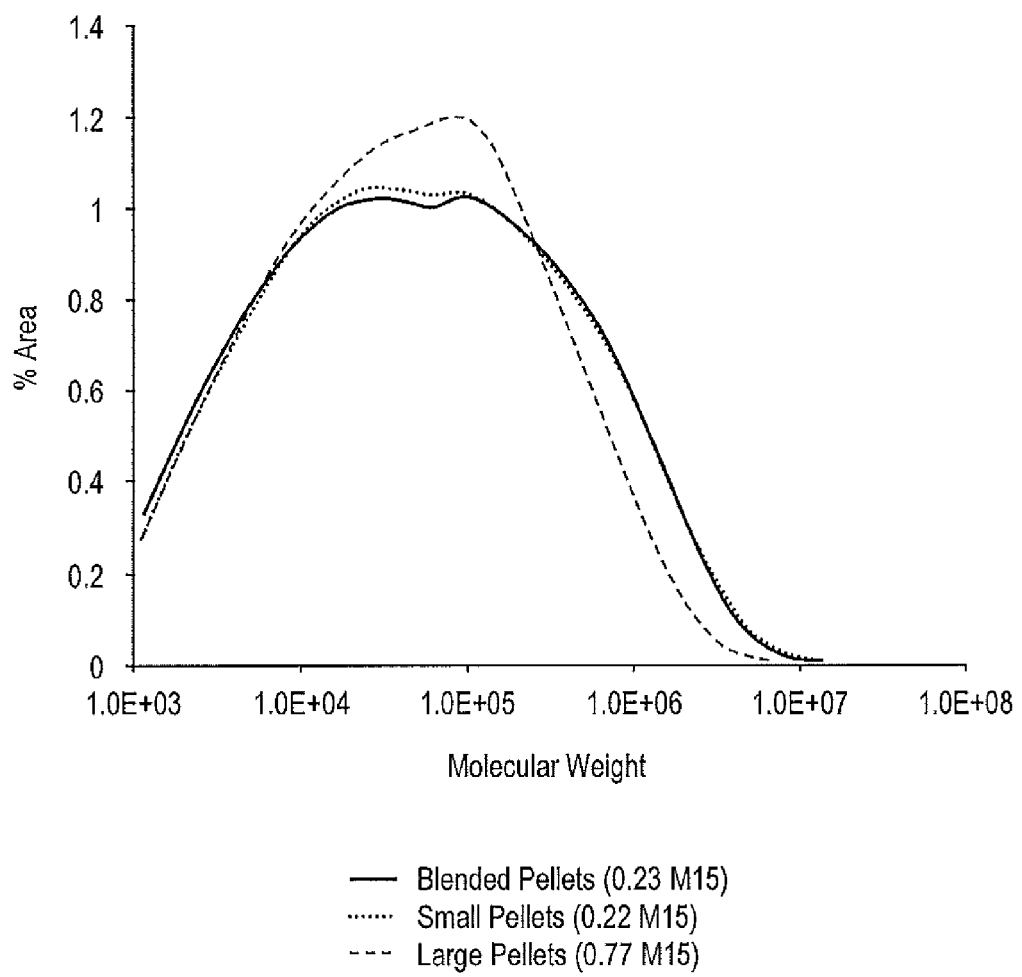
FIG. 5 is a schematic plot of the GPC trace of big and small pellets of bimodal polyethylene.
Figure 6:
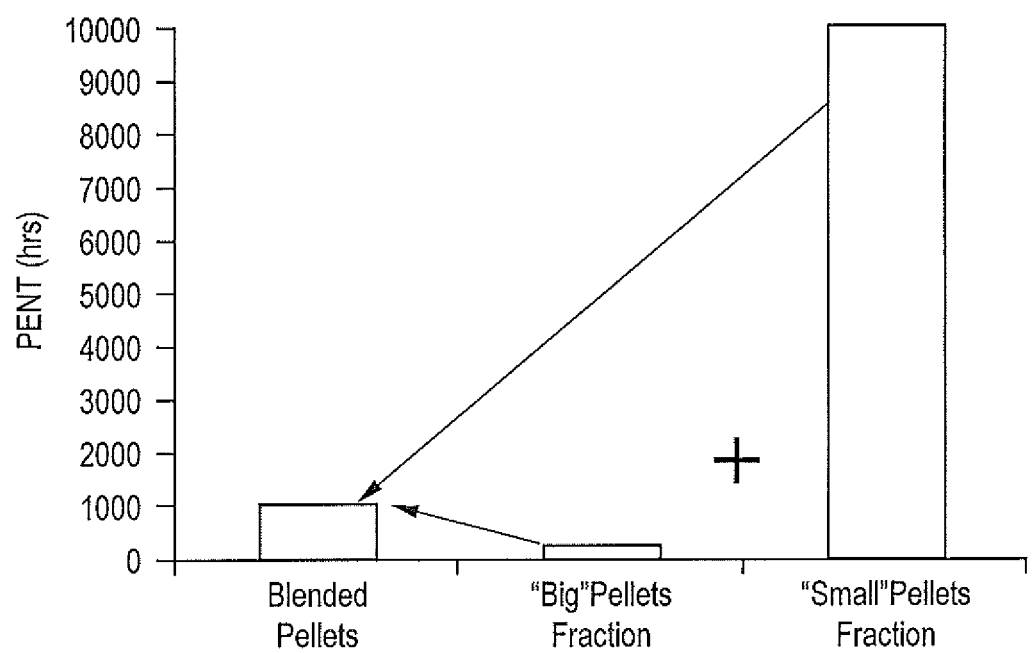
FIG. 6 is a schematic plot of the PENT of big and small bimodal polyethylene pellets.

Upon analysis, the bigger pellets were found to have a degraded Mz section, as shown in FIG. 5. Even a small amount of degraded pellets can be very detrimental to the PENT properties (see FIG. 6). No big pellets were observed for the extrusion leading to 10,000 hours PENT. This is strong evidence that this degraded portion of material is created in extrusion. Using different flow obstruction settings in the extruder that change the shear history inside the machine can reduce the portion of degraded material (i.e., number of big pellets).

Example 7

A sample of XT10N bimodal polyethylene fluff was compounded on a Brabender extruder), with the independent variables or input parameters being shear-rate and temperature (see Table 6). The shear-rate was controlled by using a capillary die of known geometry that was inline with the twin-screw extruder. The temperature and shear in the extruder were kept at values thought to avoid degradation in the XT1ON HDPE pipe-grade resin (190-200° C. and less than 20-rpm), to concentrate the potential degradation in the capillary die.

TABLE 6

DOE Using Shear Rate and Temperature

| Run # | Shear rate, s-1 | Temperature, ° C. |
| --- | --- | --- |
| 1.0 | 1000 | 290 |
| 2.0 | 400 | 240 |
| 3.0 | 3000 | 240 |
| 4.0 | 3000 | 190 |
| 5.0 | 3000 | 290 |
| 6.0 | 1000 | 190 |
| 7.0 | 400 | 190 |
| 8.0 | 1000 | 240 |
| 9.0 | 400 | 290 |

Figure 7:
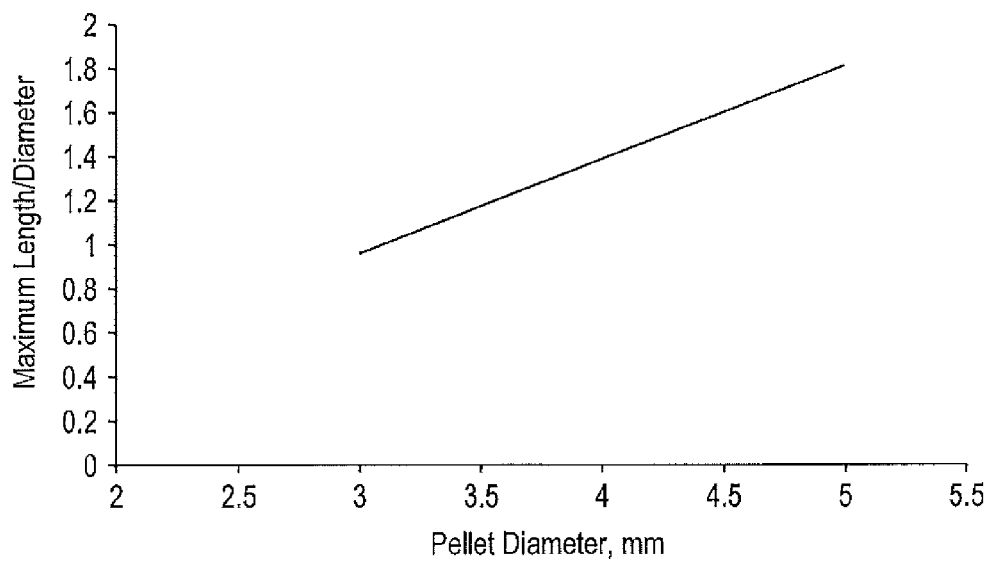
FIG. 7 is a schematic plot of the pellet size recommended for optimal single screw extruder feeding.

In an aspect, the recommended size of pellets for optimal single screw extruder feeding is shown in FIG. 7.

Example 8

Figure 8:
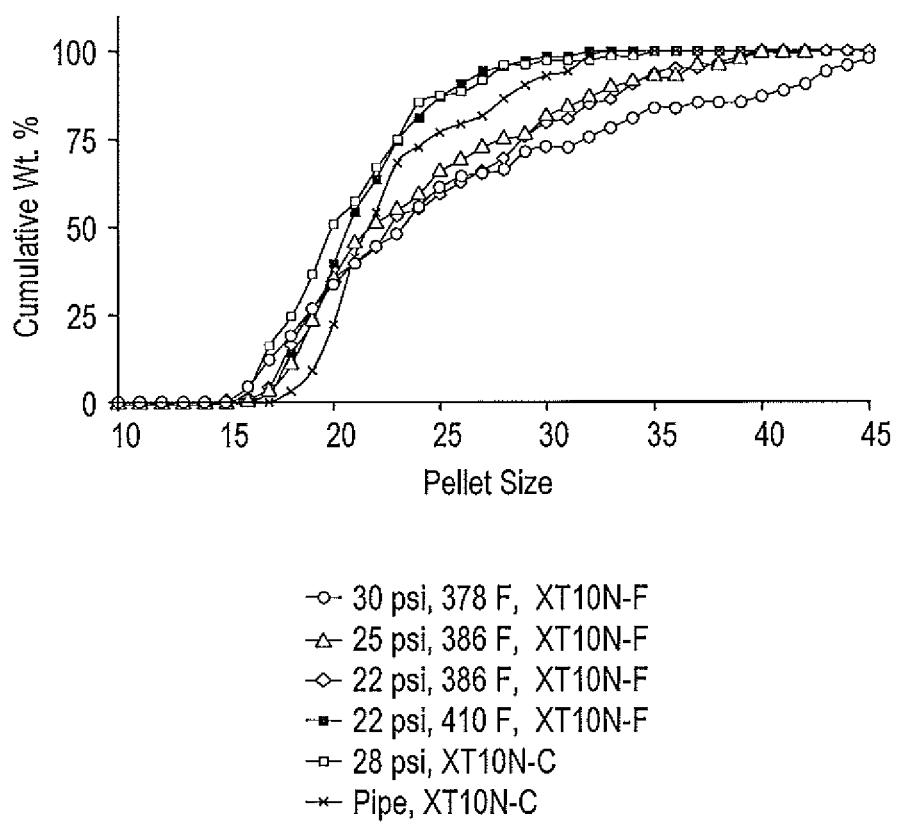
FIG. 8 is a schematic plot of bimodal polyethylene pellet size distribution as a function of suction pressure.

During the production of a large part blow molding (LPBM) experimental grade of XT10N bimodal HDPE in a Kobe extruder at full speed, at approximately 41,000 lbs/hr rates, the gear pump suction pressure was lowered from approximately 30 to approximately 22 psig. Pellet samples were collected at different suction pressures and the size distributions measured. A decrease in the suction pressure reduced the number of very large pellets and narrowed the size distribution. Also, the melt temperature began to decrease, and the gate was closed to increase the temperature which appeared to narrow the pellet size distribution even further. These results are shown in FIG. 8. Additionally, high color values can be an indication of polymer degradation and these changes did not lead to higher YI values, which remained around −3.

The change in gear pump suction pressure is consistent with the expected improvement in pellet size distribution. In the Kobe experiments, high and low suction pressure as well as high and low throughputs, a decrease in rate, or an increase in gear pump suction pressure causes an increase in "a" and a decrease in lambda for the Carreau-Yasuda analysis. At first impression the rate seems to have the strongest effect. See e.g. FIG. 9.

The key result is that the data for the high rate, low suction pressure condition are closest to the e.g., 0.23 "a" and 0.5-0.6 lambda which are typically being seen for the fluff. That is, such conditions are giving the least degradation.

Example 9

Slow crack growth resistance properties were studied for certain extrusion samples. The samples were compression molded according to ASTM D1928 and prepared for PENT testing following ASTM F1473. The Kobe samples at the lower rate have the lowest PENT, whereas the higher rates will have better performance, although the higher suction pressure yield better results. Based on previous studies, lower suction pressures were thought to be better for PENT performance.

Larger pellets have been shown to have very low slow crack growth resistance, and appear to be directly responsible for poor PENT performance. A lower production rate results in lower PENT performance, which can be explained somewhat by a longer average residence time in the extruder. This is because at lower production rates, the material experiences more chain scission than at higher rate. On the other hand, the effect of suction pressure on PENT performance can be understood by the fact that the higher suction pressure yields thinner lamella. Thus, this finding provides a logical explanation for the unexpected effect of suction pressure on PENT performance.

Example 10

Study of Slow Crack Growth (SCG) Performance

The reduced slow crack growth (SCG) resistance due to degradation upon extrusion was explored, using PENT.

The samples chosen were three XT10N samples, designated as Sample "B" produced on the Brabender at different extrusion conditions at 40 RPM, at 120 RPM with 100% feed, and at 120 RPM with 50% feed. The samples have the same density, but had different PENT failure times, as shown in Table 7.

TABLE 7

PENT Failure Times for Brabender Extruder Samples

| Material Lot | PENT (hrs) |
|---|---|
| XT10N D 40 RPM | 2500 |
| XT10N D 120 rpm/100% | 950 |
| Xt10N D 120 rpm/50% | 75 |

These density, DSC, and GPC were also determined for the same three samples. Table 8 displays the results of the analyses.

TABLE 8

Analytical Results for Brabender Extruded Samples

| Material Lot | Density ρ g/cm³ | Crystallinity χ % | Mw | Melting Point $T_m$ C. | PENT |
|---|---|---|---|---|---|
| XT10N D 40 RPM | 0.9483 | 0.657 | 372261 | 129.700 | 2500 |
| XT10N D 120 rpm/100% | 0.9484 | 0.651 | 331571 | 130.370 | 950 |
| XT10N D 120 rpm/50% | 0.9484 | 0.681 | 243609 | 131.030 | 75 |

The XT10N Sample B prepared at 40 RPM is still being tested, and is currently at 2500 hours.

Table 9 displays the calculated lamella thickness and the Mz values, as measured by GPC, for the Brabender extruded materials. A material that possesses a high Mz value contains longer chains. Therefore, a material that demonstrates a high Mz value and thin crystal lamella will hence display good slow crack growth performance when compared to materials with thicker lamella and lower Mz values. This statement is supported by the data displayed in Table 9. The materials with the highest Mz values also have the thinnest lamella thickness, thus leading to higher PENT failure times.

TABLE 9

Mz versus Crystal Lamella Thickness For Brabender Samples

| Material Lot | Mz | Crystal Thickness $L_c$ nm |
|---|---|---|
| XT10N - D 40 RPM | 3383966 | 22.6 |
| XT10N - D 120 rpm/100% | 2576969 | 24.0 |
| XT10N - D 120 rpm/50% | 1577613 | 25.5 |

Example 11

Kobe Versus Brabender Extrusion

Several standard XT10N batch samples (known as Box 852, Box 855, Box 857, and Box 858) were also studied. All of these samples were produced with the Ziegler-Natta/TNOAl (n-octyl aluminum) campaign on the Kobe extruder.

Table 10 shows the results from this study. When compared with the Brabender extruded samples from the previous example, it is clear that the Kobe material undergoes a significant amount of degradation. For example, the Mz of the Kobe materials is similar to the Brabender material at the higher RPM and longer residence time (50% feed). The lamella is also thicker, both of which are signs of degradation occurring. Note also that since the Mw and Mz of the Kobe materials do not change very much, and corresponding PENT performance is primarily driven by crystal thickness for these materials.

TABLE 10

Standard Batch Sample Data-Kobe Extruder

| Material Lot | Density ρ g/cm³ | Crystallinity χ % | Mw | Mz | Melting Point $T_m$ C. | PENT | Crystal Thickness L nm |
|---|---|---|---|---|---|---|---|
| Box 858 Bulk | 0.9483 | 0.669 | 274297 | 1646441 | 131.033 | 5000 | 25.5 |
| Box 852 Bulk | 0.9495 | 0.677 | 255177 | 1652721 | 132.033 | 1118 | 28.3 |
| Box 857 Bulk | 0.9481 | 0.668 | 279203 | 1824312 | 131.033 | 5000 | 25.5 |
| Box 855 Bulk | 0.9484 | 0.67 | 277915 | 1728917 | 131.700 | 2030 | 27.3 |

It appears that one way to produce 5000+PENT material is, in addition to matching production conditions, is to establish certain ranges for parameters like molecular weight, lamella thickness, density of bimodal polyethylene (see e.g. Box 857 & 858 in Table 10). It appears that if small density changes are needed, there is a good probability of making 5000 hr+PENT materials if lamella thickness is minimized and Mw and Mz are maximized. These factors correlate well with the PENT failure times and thus, is further proof that such parameters can be very useful tool for gauging slow crack growth performance of materials during production runs, even when extrusion degradation is an issue.

Example 12

XT10N versus 3344N Resin; Large, Small & Blended Pellets

To further investigate any differences in the degradation of the material that is processed by extrusion, e.g. into pellets, samples of XT10N and 3344N were extruded at the gear pressures indicated below. See Table 11. Again, differences in the sizes of pellets were noted. A sample of the blended pellets and pellets sorted as to size (large and small) were made for each extrusion condition noted below. An additional sample of XT10N was prepared using ½ the normal extrusion rate. PENT testing was then done on each of the samples, and the results are set forth below.

First, significant differences in Mw, Mz, and D (Mw/Mn) can be seen between small pellets, big pellets, and blended pellets. When these samples were tested for PENT, there were striking differences between the samples.

There were significant differences in the degradation of each type of the bimodal resins (XT10N versus 3344N), with the XT10N resin being more sensitive to degradation.

TABLE 11

XT10N versus 3344N Resin; Large, Small & Blended Pellets

| XT10N PE | GPSP (psig) | Mn | Mw | Mz | D (Mw/Mn) | MI5 | density | PENT | Est SEI (kW-h/lb) |
|---|---|---|---|---|---|---|---|---|---|
| Sample B; Blended Pellets 1 | 30 | 13,061 | 273,432 | 1,892,955 | 20.9 | 0.28 | 0.9486 | 1,204 | normal-low (185) |
| Small Pellets (1) | | 13,029 | 277,140 | 1,980,867 | 21.3 | — | — | >5,000 | |
| Big Pellets (1) | | 12,656 | 169,734 | 975,131 | 13.4 | — | — | 229 | |
| Big vs Blended (1) | | −3% | −61% | −94% | — | — | — | — | |
| Sample D: Blended Pellets 2 | 20 | 13,360 | 279,203 | 1,824,312 | 20.9 | 0.25 | 0.9486 | 5200 | normal-low (185) |
| Big Pellets (2) | | 12,727 | 306,418 | 2,219,223 | 24.1 | — | — | N/a | |
| Big vs Blended (2) | | −5% | 9% | 18% | — | — | — | — | |
| Sample D; Blended Pellets 3 | 20 | 13,404 | 274,297 | 1,646,441 | 20.5 | 0.24 | 0.9487 | 8920 | normal-low (185) |
| Big Pellets (3) | | 13,179 | 3,100,014 | 2,125,288 | 23.5 | — | — | N/a | |
| Big vs Blended (3) | | −2% | 91% | 23% | — | — | — | — | |
| Sample D; Blended Pellets 4 | 20 | 13,726 | 285,803 | 1,774,224 | 20.8 | 0.26 | 0.9483 | 9900 | normal-low (185) |
| ½ rate trial | high (30) | | | | | 0.28 | 0.948 | <500 | high (>300) |
| Comp. 3344 PE (5) | 15 | 13,788 | 258,136 | 1,611,066 | 18.7 | 0.33 | 0.946 | 1720 | normal-low (185) |
| Big Pellets (5) | | 13,766 | 250,798 | 1,638,577 | 18.2 | — | — | — | |
| Big vs Blended (5) | | 0% | −3% | 2% | — | — | — | — | |
| Comp. 3344 (6) | 22 | 13,245 | 266,833 | 1,717,899 | 20.1 | 0.33 | 0.946 | 1550 | normal-low (185) |
| Big Pellets (6) | | 13,596 | 262,275 | 1,729,790 | 19.3 | — | — | — | |
| Big vs Blended (6) | | 3% | −2% | 1% | — | — | — | — | |
| Comp. 3344 (7) | 28 | 13,889 | 248,647 | 1,411,495 | 17.9 | 0.33 | 0.946 | 1390 | normal-low (185) |
| Big Pellets (7) | | 13,745 | 238,233 | 1,332,034 | 17.3 | — | — | — | |
| Big vs Blended (7) | | −1% | −4% | −6% | — | — | — | — | |
| Comp. 3344 (8) | 33 | 13,582 | 258,437 | 1,681,453 | 19.0 | 0.33 | 0.946 | 1250 | normal-low (185) |
| Big Pellets (8) | | 13588 | 244731 | 1465610 | 18.0 | — | — | — | |
| Big vs Blended (8) | | 0% | −6% | −15% | — | — | — | — | |

| | d-Mn | d-Mw | d-Mz | d-PENT |
|---|---|---|---|---|
| Blended (6) vs Blended (5) | −4% | 3% | 7% | −10% |
| Blended (7) vs Blended (5) | 1% | −4% | −12% | −19% |
| Blended (8) vs Blended (5) | 0% | −5% | −19% | −27% |

Table 11 is related to Table 12, and details the changes in certain physical characteristics between the samples.

TABLE 12

XT10N & 3344N Resins, Comparison of Physical Characteristics

|  |  | change in Mn | change in Mw | change in Mz | MI5 | density | PENT | Est SEI (kW-h/lb) | GPSP (psig) |
|---|---|---|---|---|---|---|---|---|---|
| Ex (2) XT10N | Big vs Blended pellets | −5% | 9% | 18% | 0.25 | 0.9486 | 5200 | normal-low (185) | Low (20) |
| Ex (3) XT10N | Big vs Blended pellets | −2% | 91% | 23% | 0.24 | 0.9487 | 8920 | normal-low (185) | Low (20) |
| Comp. Ex ½ rates Sample |  |  |  |  | 0.28 | 0.948 | <500 | high (>300) | High (30) |
| Comp. Ex (5) 3344 Next cond (a) | Big vs Blended pellets | 0% | −3% | 2% | 0.33 | 0.946 | 1720 | normal-low (185) | Low (15) |
| Comp. Ex (6) 3344 Next cond (b) | Big vs Blended pellets | 3% | −2% | 1% | same | same | 1550 | Same | 22 |
| Comp. Ex (7) 3344 Next cond (c) | Big vs Blended pellets | −1% | −4% | −6% | same | same | 1390 | Same | 28 |
| Comp. Ex (8) 3344 Next cond (d) | Big vs Blended pellets | 0% | −5% | −19% | same | same | 1250 | Same | High (33) |

|  | change in Mn | change in Mw | change in Mz | change in PENT |
|---|---|---|---|---|
| Sample (6) vs. Sample (5) | −4% | 3% | 7% | −10% |
| Sample (7) vs. Sample (5) | 1% | −4% | −12% | −19% |
| Sample (8) vs. Sample (5) | 0% | −5% | −19% | −27% |

Under certain conditions, the bimodal 3344N HDPE was less degraded during Kobe extrusion than bimodal Z-N Catalyzed XT10N HDPE material. It is possible that decreasing the suction pressure during XT10N production limits this degradation and results in much sharper increase in the PENT of the XT10N HDPE pipe grade than in the 3344N HDPE pipe grade.

Therefore, by controlling flow obstructing devices and shear history in extrusion, it is possible to minimize the changes in certain physical characteristics and to improve PENT performance of bimodal polyethylene materials.

Product Applications

The polymers and blends thereof are useful in applications known to one skilled in the art, such as forming operations (e.g., film, sheet, pipe and fiber extrusion and co-extrusion as well as blow molding, injection molding and rotary molding).

Pipe articles include, for example, extruded pipe and tubing, and molded fittings, and pipe coatings for end use applications in industrial/chemical processes, mining operations, gas distribution, potable water distribution, gas and oil gathering, fiberoptic conduit/inner duct, sewer systems and pipe relining, as well as other such piping and tubing articles known to one skilled in the art.

Extruded articles include medical tubing, wire and cable coatings, geomembranes and pond liners, for example, as well as other types of extruded articles known to one skilled in the art.

Molded articles include single and multi-layered constructions in the form of bottles, tanks, large hollow articles, piping and tubing, food containers and toys, industrial parts, such as, but not limited to, carry cases for hardware (e.g. saws, tools, etc.) and stadium seating, industrial containers, such as, but not limited to, jerry cans for agriculture chemicals, photochemicals, and institutional food products (e.g. oils, ketchup, etc.), and consumer containers, such as, but not limited to, detergent bottles (handleware and non-handleware), personal care bottles (shampoo, cosmetics, etc.), and skin care bottles, for example, as well as other types of molded articles known to one skilled in the art.

The improved polymers are also useful in FDA-approved applications.

In one embodiment, the molded articles are formed by blow molding on a Continuous Extrusion Blow Molder available from Bekum, Uniloy, Automa, Jomar, Graham Engineering, Wilmington, et. al, for example. Other types of extruders known to one skilled in the art can also be used to make articles from the resin of this invention.

While all of the foregoing is directed to embodiments of the present invention, other and further embodiments of the invention may be devised without departing from the basic scope thereof and the scope thereof is determined by the claims that follow.

What is claimed is:

1. A method comprising:
   controlling degradation of polyethylene during extrusion by adjusting a gear suction pressure to less than 33 psi;
   measuring Mz of the polyethylene and controlling the specific energy input (SEI) to minimize change in the Mz to less than 10% of an Mz of the polyethylene before extrusion; and
   forming an article.

2. The method of claim 1, wherein the article comprises pellets.

3. The method of claim 1, wherein the article comprises a tubular member or pipe.

4. The method of claim 3, wherein the article has a PENT of at least 1500 using test ASTM F 1473.

5. The method of claim 1, wherein adjusting the gear suction pressure controls the SEI to less than 300 kWh/ton, and wherein PENT of the article is increased as compared to a method otherwise identical except that the SEI is not controlled to less than 300 kWh/ton.

6. The method of claim 1, wherein the polyethylene is formed by polymerizing an ethylene monomer in the presence of a Ziegler-Natta catalyst.

7. The method of claim 6, wherein the Ziegler-Natta catalyst is formed by a process comprising:
   contacting an alkyl magnesium compound with an alcohol to form a magnesium dialkoxide compound;
   contacting the magnesium dialkoxide compound with a first agent selected from $ClTi(O^iPr)_3$, $ClSi(Me)_3$, and combinations thereof to form a reaction product "A";
   contacting the reaction product "A" with a second agent comprising $TiCl_4/Ti(OBu)_4$ to form a reaction product "B";
   contacting the reaction product "B" with a third agent comprising $TiCl_4$ to form a reaction product "C";
   contacting the reaction product "C" with a fourth agent comprising $TiCl_4$ to form a reaction product "D"; and
   contacting the reaction product "D" with a fifth agent selected from TMA, TIBAl, TEAl, n-octyl aluminum, n-hexyl aluminum, and combinations thereof to form the Ziegler-Natta catalyst.

8. The method of claim 1, wherein the polyethylene exhibits a density ranging from about 0.930 g/cc to about 0.960 g/cc.

9. The method of claim 1, wherein the polyethylene exhibits molecular weight distribution ranging from 10 to 25.

10. The method of claim 1, wherein the polyethylene exhibits a melt flow index ($MI_5$) of from about 0.1 dg/min to about 0.5 dg/min.

11. The method of claim 1, wherein the polyethylene exhibits a flexural modulus of from 90,000 psi to 200,000 psi.

12. A method comprising:
   extruding polyethylene from an extruder and controlling degradation of the polyethylene during extrusion by:
   measuring a specific energy input (SEI) to the extruder and adjusting a process parameter selected from the group consisting of throughput, gear suction pressure, and a combination thereof to control the SEI to less than 300 kWh/ton;
   measuring Mz of the polyethylene and controlling the SEI to minimize change in the Mz to less than 10% of an Mz of the polyethylene before extrusion; and
   forming an article.

13. The method of claim 12, wherein the article comprises pellets.

14. The method of claim 12, wherein the article comprises a tubular member or pipe.

15. The method of claim 14, wherein the article has a PENT of at least 1500 hours using test ASTM F 1473.

16. The method of claim 12, wherein the polyethylene is formed by polymerizing an ethylene monomer in the presence of a Ziegler-Natta catalyst.

17. The method of claim 16, wherein the Ziegler-Natta catalyst is formed by a process comprising:
   contacting an alkyl magnesium compound with an alcohol to form a magnesium dialkoxide compound;
   contacting the magnesium dialkoxide compound with a first agent selected from $ClTi(O^iPr)_3$, $ClSi(Me)_3$, and combinations thereof to form a reaction product "A";
   contacting the reaction product "A" with a second agent comprising $TiCl_4/Ti(OBu)_4$ to form a reaction product "B";
   contacting the reaction product "B" with a third agent comprising $TiCl_4$ to form a reaction product "C";
   contacting the reaction product "C" with a fourth agent comprising $TiCl_4$ to form a reaction product "D"; and
   contacting the reaction product "D" with a fifth agent selected from TMA, TIBAl, TEAl, n-octyl aluminum, n-hexyl aluminum, and combinations thereof to form the Ziegler-Natta catalyst.

18. The method of claim 12, wherein the polyethylene exhibits a density ranging from about 0.930 g/cc to about 0.960 g/cc and a molecular weight distribution ranging from 10 to 25.

19. The method of claim 12, wherein the polyethylene exhibits a melt flow index ($MI_5$) of from about 0.1 dg/min to about 0.5 dg/min.

20. The method of claim 12, wherein the polyethylene exhibits a flexural modulus of from 90,000 psi to 200,000 psi.

* * * * *